United States Patent
Wei

(10) Patent No.: US 12,540,712 B1
(45) Date of Patent: Feb. 3, 2026

(54) FLAME LAMP

(71) Applicant: Guangzhou Xushen Technology Co., Ltd., Guangdong (CN)

(72) Inventor: Song Wei, Guangdong (CN)

(73) Assignee: Guangzhou Xushen Technology Co., Ltd., Guangzhou (CN)

( * ) Notice: Subject to any disclaimer, the term of this patent is extended or adjusted under 35 U.S.C. 154(b) by 0 days.

(21) Appl. No.: 19/243,049

(22) Filed: Jun. 19, 2025

(30) Foreign Application Priority Data

Mar. 31, 2025 (CN) .......................... 202520600376.X
Jun. 6, 2025 (CN) .......................... 202521161175.0

(51) Int. Cl.
| | |
|---|---|
| *F21S 10/04* | (2006.01) |
| *F21S 4/24* | (2016.01) |
| *F21V 21/008* | (2006.01) |
| *F21V 23/00* | (2015.01) |
| *H05B 45/10* | (2020.01) |
| *H05B 45/20* | (2020.01) |
| *H05B 47/155* | (2020.01) |
| *H05B 47/16* | (2020.01) |
| *F21Y 115/10* | (2016.01) |

(52) U.S. Cl.
CPC ............... *F21S 10/043* (2013.01); *F21S 4/24* (2016.01); *F21V 21/008* (2013.01); *F21V 23/001* (2013.01); *H05B 45/10* (2020.01); *H05B 45/20* (2020.01); *H05B 47/155* (2020.01); *H05B 47/16* (2020.01); *F21Y 2115/10* (2016.08)

(58) Field of Classification Search
CPC .......... F21S 10/043; F21S 4/24; H05B 45/20; H05B 47/16; H05B 47/155; H05B 45/10; F21V 21/008; F21V 23/001; F21Y 2115/10
See application file for complete search history.

(56) References Cited

U.S. PATENT DOCUMENTS

| | | | |
|---|---|---|---|
| 10,344,930 B1 * | 7/2019 | Mitchell, Jr. | F21K 9/23 |
| 12,196,382 B1 * | 1/2025 | Jiang | F21V 23/0435 |
| 2003/0072154 A1 * | 4/2003 | Moore | H05B 45/44 |
| | | | 362/234 |
| 2018/0347771 A1 * | 12/2018 | Ansems | H05B 45/00 |
| 2019/0003669 A1 * | 1/2019 | Miller | H05B 45/325 |
| 2021/0283295 A1 * | 9/2021 | Hsu | A61L 9/03 |
| 2023/0204170 A1 * | 6/2023 | Lee | F21S 4/10 |
| | | | 315/167 |

* cited by examiner

*Primary Examiner* — Bao Q Truong

(57) ABSTRACT

A flame lamp, includes a main control chip and at least one lighting assembly. Each lighting assembly includes a plurality of lighting structures, the plurality of lighting structures include a plurality of lighting elements and a plurality of sub-control chips; and each lighting structure includes respective one of the plurality of lighting element and respective one of the plurality of sub-control chips electrically connected to the respective one of the plurality of lighting element; the plurality of sub-control chips are signally connected with each other in sequence; the main control chip is signally connected to an initial sub-control chip of each lighting assembly, the main control chip is configured to control the plurality of lighting elements through the plurality of sub-control chips according to a set timing sequence to simulate a shape of a real flame.

19 Claims, 13 Drawing Sheets

FLAME LAMP

CROSS REFERENCE TO RELATED APPLICATIONS

The present application claims the priority of Chinese patent application No. 202520600376.X, filed on Mar. 31, 2025; Chinese patent application No. 202521161175.0, filed on Jun. 6, 2025, contents of which are incorporated herein by its entirety.

FIELD

The present disclosure relates to the field of lighting devices, and particularly to a flame lamp.

BACKGROUND

In the related art, a flame lamp typically includes a plurality of lamp beads arranged on a lamp board. A main control chip is configured to control on-off variations of the plurality of lamp beads to simulate a real flame effect, and each lamp bead is connected to the main control chip via a signal transmission wire, which results in a complex control circuit and leads to significant difficulties in wiring. In addition, the lamp beads are fixed on the lamp board, which limits a flexibility of flame lamp in shaping, such that the flame lamps in the art are difficult to meet diversified design requirements.

Therefore, it is necessary to improve the existing flame lamps in order to overcome the above-mentioned drawbacks.

SUMMARY

A flame lamp, includes a main control chip and at least one lighting assembly. Each lighting assembly includes a plurality of lighting structures, the plurality of lighting structures include a plurality of lighting elements and a plurality of sub-control chips; and each lighting structure includes respective one of the plurality of lighting element and respective one of the plurality of sub-control chips electrically connected to the respective one of the plurality of lighting element; the plurality of sub-control chips are signally connected with each other in sequence; the main control chip is signally connected to an initial sub-control chip of each lighting assembly, the main control chip is configured to control the plurality of lighting elements through the plurality of sub-control chips according to a set timing sequence to simulate a shape of a real flame.

A flame lamp, includes at least one flexible light strip and a main control chip, the flexible light strip includes a wire and a plurality of lighting structures that are sequentially connected via the wire; the plurality of lighting structures of the at least one flexible light strip together form a flame section; the main control chip is electrically connected to the at least one flexible light strip, and is configured to control on-off variations of the plurality of lighting structures in the flame section according to a set timing sequence to simulate a shape of a real flame.

BRIEF DESCRIPTION OF THE DRAWINGS

To provide a clearer illustration of the technical solutions in the embodiments of the present disclosure or in the prior art, a brief introduction will be given to the drawings used in the description of the embodiments or the prior art. It is obvious that the drawings described below are merely some embodiments of the present disclosure, and for those skilled in the art, other drawings can be obtained based on these drawings without creative efforts.

DETAILED DESCRIPTION

Figure 1:
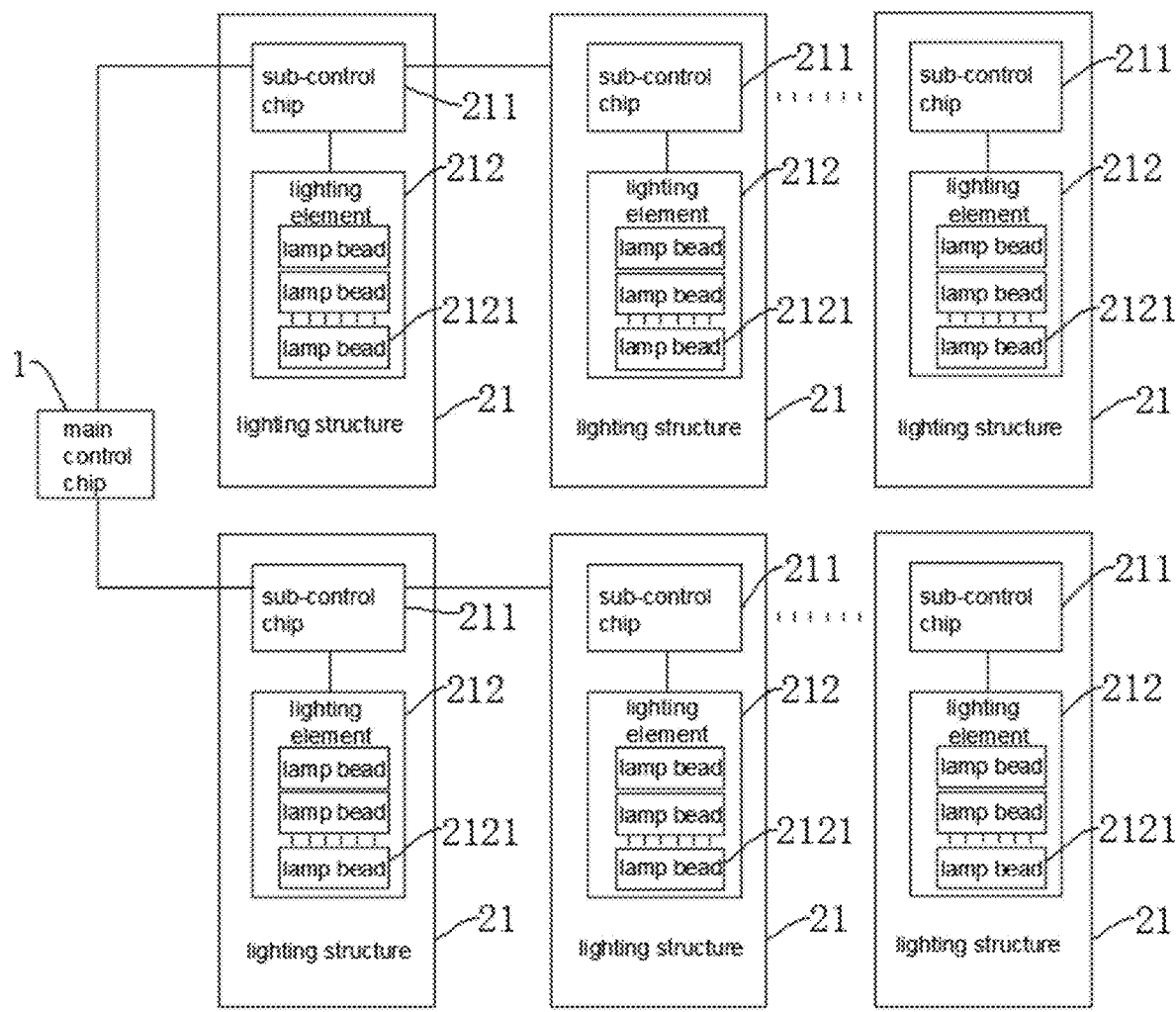
FIG. 1 is a schematic block diagram of a flame lamp according to an embodiment of the present disclosure.

Unless otherwise defined, all technical and scientific terms used herein have the same meaning as commonly understood by those skilled in the art to which this disclosure belongs. The terms used in the description of the application herein are intended for describing particular embodiments only and are not intended to limit the present disclosure. In the description, claims, and the above drawings of the present disclosure, the terms "comprising" and "having", as well as their variants, are intended to convey a non-exclusive inclusion. The terms "first", "second", etc., as used herein, are intended to distinguish between different objects, rather than to describe a particular order.

Reference to "embodiments" herein implies that a particular feature, structure, or characteristic described in connection with an embodiment may be included in at least one embodiment of the present disclosure. The appearance of the phrase at various places in the specification does not necessarily refer to the same embodiment, nor is it a separate or alternative embodiment that is mutually exclusive of other embodiments. One skilled in the art would explicitly and implicitly understand that the embodiments described herein can be combined with other embodiments.

In order to enable those skilled in the art to better understand the technical solutions of the present disclosure, the technical solutions in the embodiments of the present disclosure will be clearly and completely described below with reference to the accompanying drawings.

To address the above technical problem, according to FIGS. 1 to 6, the present application provides a flame lamp, including a main control chip 1 and at least one lighting assembly 20. The main control chip 1 is configured to generate and transmit a plurality of control signals. The number of the at least one lighting assembly 20 can be one or multiple. Each lighting assembly 20 includes a plurality of lighting structures 21. The plurality of lighting structures 21 includes a plurality of lighting elements 212 and a plurality of sub-control chips 211. Each lighting structure 21 includes respective one of the plurality of lighting elements 212 and respective one of the plurality of sub-control chips 211 electrically connected to the respective one of the plurality of lighting elements 212, each of the plurality of lighting elements 212 may be a light-emitting diode (LED) lamp bead. The plurality of sub-control chips 211 of each lighting assembly 20 are signally connected in sequence, a signal output terminal of a preceding sub-control chip is connected to a signal input terminal of a succeeding sub-control chip. The main control chip is signally connected to an initial sub-control chip of each lighting assembly 20. Each control signal emitted by the main control chip 1 is first transmitted to the initial sub-control chip of each lighting assembly 20, and then transmitted to the succeeding sub-control chip. Each sub-control chip 211 of the plurality of sub-control chips 211 is configured to respond to and execute the corresponding control signal, in this way, the plurality of lighting elements 212 can be controlled simultaneously. The main control chip 1 is configured to control each lighting element 212 of the plurality of lighting elements 212 to perform on-off variations according to a set timing sequence, such that the plurality of lighting elements 212 can simulate a shape of a real flame. Therefore, the plurality of lighting structures 21 of a same lighting assembly 20 are connected to the main control chip 1 through only one signal transmission wire 221, which significantly simplifies the control circuit, reduces wiring complexity and a cost of wiring. Each lighting structure 21 is provided with a sub-control chip 211, such that individual control of each lighting element 212 can be achieved. Therefore, a refresh rate of the lighting element 212 can be increased, and the flame lamp can display a more refined and precise flame shape.

Figure 2:
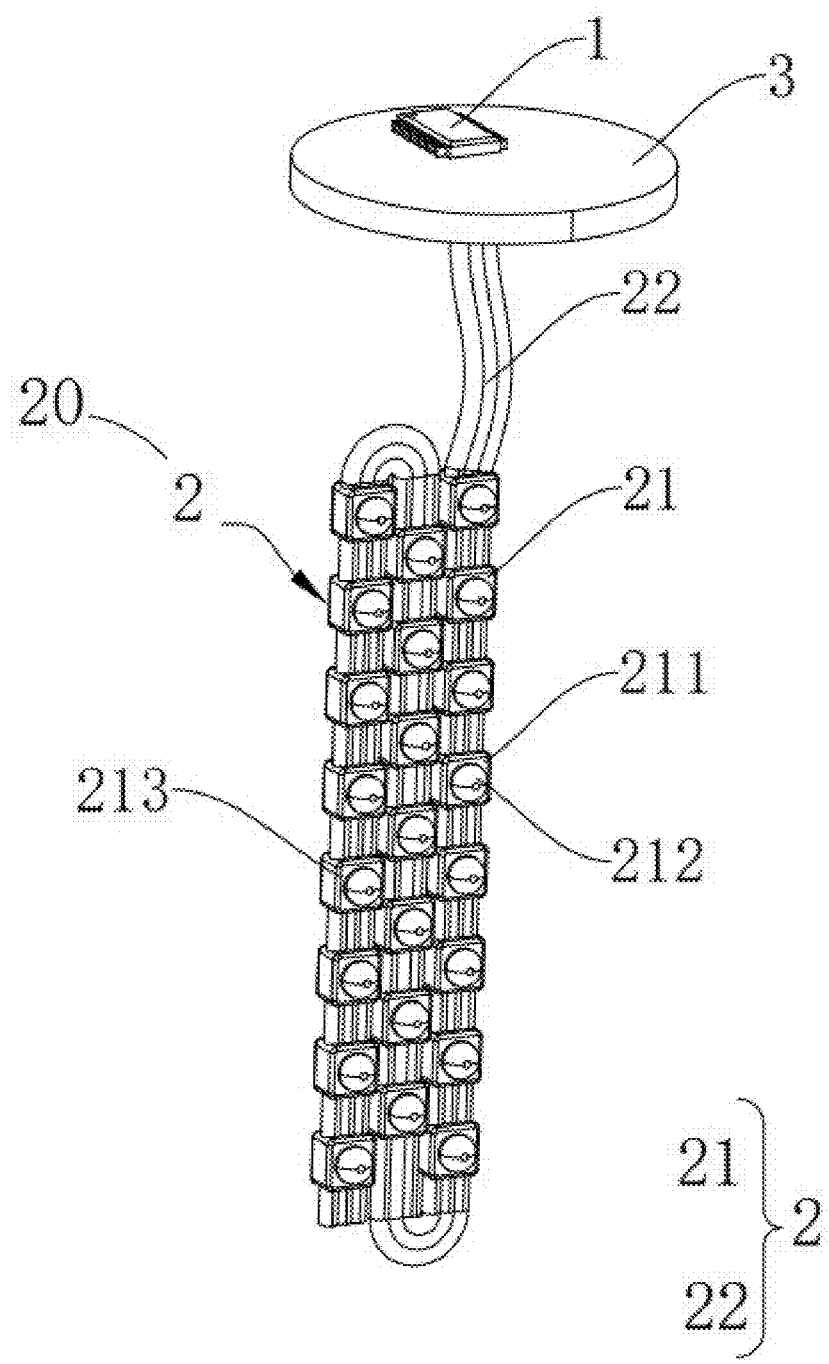
FIG. 2 is a first structural schematic view of the flame lamp according to an embodiment of the present disclosure.

In an embodiment of the present disclosure, as shown in FIG. 2, at least one lighting assembly 20 is a flexible light strip 2. It should be understood that either a single flexible light strip 2 or a plurality of light strip 2 may be provided in different embodiments. Each flexible light strip 2 includes a plurality of lighting structures 21, and each lighting structure 21 is provided with a sub-control chip 211. The plurality of sub-control chips 211 in a same flexible light strip 2 are signally connected in-series, which enables the main control chip 1 to unified and orderly control all the sub-control chips 211 in the same flexible light strip 2. Since the lighting assembly 20 is configured as the flexible light strip 2 which is bendable and foldable, the flame lamp can form various shapes during installation and use, such that various demands of various uses may be satisfied.

In some embodiments, the lighting assembly 20 may be configured as a rigid lamp board or a flexible lamp board. In this case, the plurality of lighting structures 21 and the main control chip 1 are arranged on the lamp board. It should be understood that the rigid lamp board has a stable structure and may be installed easily. The flexible lamp board maintains flexibility and provides more design possibilities. The flexible lamp board is able to adapt to installation environments requiring slight bending and provide good optical performance.

In an embodiment of the present disclosure, as shown in FIG. 1, the main control chip 1 is configured to generate the plurality of control signals, each control signal corresponding to one of the sub-control chips 211. The plurality of control signals collectively constitute a command packet. The plurality of control signals are transmitted sequentially within the same flexible light strip 2 according to a signal connected order of the plurality of sub-control chips 211, which refers to a physical or logical arrangement of the plurality of sub-control chips 211 in a sequential manner along the flexible light strip 2, and each of the plurality of sub-control chips 211 receives and processes the corresponding control signal in turn. In other words, after receiving the command packet, each sub-control chip 211 does not parse or execute any command immediately. Instead, the entire command packet is transmitted from one sub-control chip 211 to a next sub-control chip 211, following a sequence of the signal series connection, until the command packet reaches the last sub-control chip 211. When a plurality of flexible light strips 2 are provided, in an embodiment, a first sub-control chip 211 of each flexible light strip 2 is connected in signal parallel with the main control chip 1, which means that the main control chip 1 is connected to each first sub-control chip 211 through a same signal path. In other words, the main control chip 1 sends a corresponding command packet to the first sub-control chip 211 of each flexible light strip 2, each first sub-control chip 211 then transmits the corresponding command packet to the subsequent sub-control chips 211 in sequence. In this way, signal interference can be effectively prevented, and an electrical system of the flame lamp can be more stable and reliable.

In an embodiment, as shown in FIG. 1, after all of the plurality of sub-control chips 211 receive the command packet, the main control chip 1 then sends out a latch signal. Before receiving the latch signal, each sub-control chip 211 stores the command packet temporarily instead of parsing or executing the control signal in the packet. At this stage, each sub-control chip 211 remains in a "waiting for latch signal" state. When the main control chip 1 confirms that all sub-control chips 211 have received the command packet, the main control chip 1 sends out the latch signal. The latch signal can be a specific level signal, such as a high level or a low level. After receiving the latch signal, each sub-control chip 211 begins to parse the command packet, extracts the corresponding control signal associated with the respective sub-control chip 211, and stores the control signal into a storage unit within the sub-control chip 211. The latch signal ensures that all of the plurality of sub-control chips 211 simultaneously parsing and simultaneously storing the command packet. After the command packet has been stored, the main control chip 1 sends a display signal, which is also referred to as an execution signal. Each sub-control chip 211, based on the stored control signal, activates the corresponding lighting element 212, such as lighting up the lighting element 212, adjusting a brightness or a color of the lighting element 212. In this way, the plurality of lighting elements 212 can be simultaneously activated. The latch signal prevents each sub-control chip 211 from executing the command packet immediately upon receipt. Instead, each sub-control chip 211 holds the command packet and waits for the latch signal to trigger execution, which helps avoid timing discrepancies in execution caused by different parsing speeds among the plurality of sub-control chips.

In an embodiment of the present disclosure, as shown in FIG. 1, each control signal includes display color information for controlling a color of the lighting element 212, display brightness information for controlling a brightness level of the lighting element 212, and lighting duration information for controlling a flickering frequency of the lighting element 212. The above information enables a precise adjustment of a flame effect of the flame lamp. To be specific, the display color information specifies the color to be presented by the lighting element 212 at a specific moment, to simulate a color variation of the real flame. The display brightness information adjusts an intensity of lighting to simulate a brightness variation of the real flame. The lighting duration information determines the flickering frequency of the lighting element 212 to simulate a dynamic flame effect and imitate a movement of the real flame. By executing multi-dimensional control signals, the flame lamp is capable of producing more realistic and diverse flame effects to meet the requirements of different applications and user preferences.

In an embodiment, as shown in FIG. 1, the lighting element 212 includes a plurality of lamp beads 2121. The plurality of lamp beads 2121 can include lamp beads 2121 emitting red light, green light, and blue light. The lighting element 212 further includes a lampshade placed over the plurality of lamp beads 2121. The lampshade is configured to mix lights from different colored lamp beads 2121 by diffusing and reflecting the lights, resulting in a uniform color display of the lighting element 212. Based on an additive color mixing principle, the brightness of the different colored lamp beads 2121 is independently controlled to adjust both the display brightness and the display color of the lighting element 212. Therefore, the flame lamp is able to present a variety of color and simulate the dynamic effect of the real flame. It should be understood that, in addition to red, green, and blue light, the plurality of lamp beads 2121 can also emit lights in other colors, such as white, yellow, or orange, as long as different lights of the plurality of lamp beads can be blended to produce a desired display color of the lighting element 212.

Figure 3:
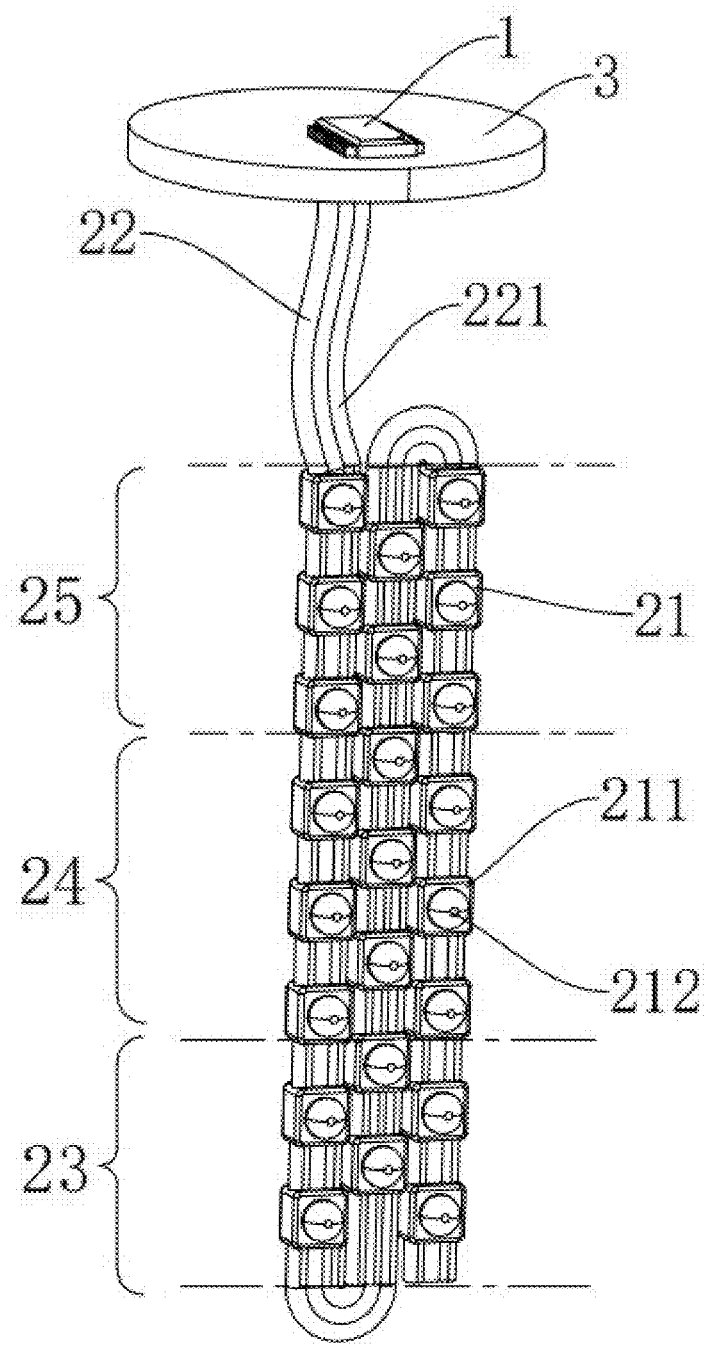
FIG. 3 is another view of the first structural schematic of the flame lamp according to an embodiment of the present disclosure.
Figure 4:
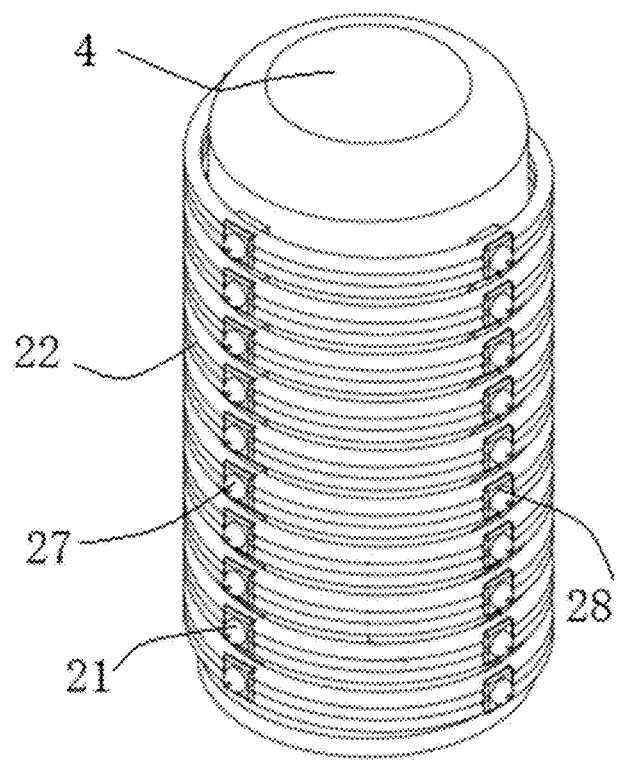
FIG. 4 is a second structural schematic view of the flame lamp according to an embodiment of the present disclosure.

In an embodiment of the present disclosure, as shown in FIGS. 3 to 4, a plurality of lighting elements 212 within the lighting assembly 20 together form a flame section 213. The flame section 213 includes a bottom portion 23, a middle portion 24, and a top portion 25 along a combustion direction from bottom to top. The bottom portion includes at least one bottom lighting element, the middle portion includes at least one middle lighting element, the top portion includes at least one top lighting element. The at least one bottom lighting element is configured to simulate a base portion of the real flame, the at least one middle lighting element is configured to simulate a main portion of the real flame, and the at least one top lighting element is configured to simulate a tip portion of the real flame. A layered arrangement described above allows the flame lamp to reproduce a natural appearance of the real flame more realistically. When the flame section 213 is upright, the bottom portion 23 is physically located at a lowest position to simulate the base portion of the real flame, the top portion 25 is physically located at a highest position to simulate the tip portion of the real flame, and the middle portion 24 is physically located between the lowest position and the highest position to simulate the main portion of the real flame. The flame lamp further includes a gravity sensor, which is configured to be electrically connected with the lighting assembly 20 and the main control chip 1. When the flame section 213 is suspended upside down, in other words, the bottom portion 23 is physically located at the highest position, the top portion 25 is physically located at the lowest position, and the middle portion 24 is physically located between the lowest position and the highest position, the gravity sensor can send a reversed state signal to the main control chip 1, the main control chip 1 then controls the bottom portion 23, the middle portion 24, and the top portion 25 to be logically reversed, that is, the bottom portion 23 is commanded to simulate the tip portion of the real flame, the tip portion 25 is commanded to simulate the base portion of the real flame, and the middle portion 24 is commanded to simulate the main portion of the real flame. In this way, even if a physical position of the flame section 213 may be changed due to an inversion, the electrical system can ensure a visual effect of the real flame, such that the base portion the main portion, and the tip portion of the real flame can be presented in a bottom-to-top order whether in an upright state or a suspended state. Therefore, an adaptability and the flexibility of the lighting assembly 20 is enhanced, and users may use the flame lamp in different scenarios more conveniently.

In an embodiment of the present disclosure, as shown in FIG. 3, the display brightness of the plurality of lighting elements 212 increases from the bottom portion 23, through the middle portion 24, and decreases from the middle portion 24 to the top portion 25. The display color of the plurality of lighting elements 212 gradually becomes lighter from the bottom portion 23 through the middle portion 24 to the top portion 25. The variation in brightness and color is performed based on physical characteristics of the real flame. During combustion, the real flame typically appears dark red or orange at the bottom portion 23, with relatively low brightness and deeper colors. The middle portion 24 transitions to bright orange or yellow, with increased brightness and lighter colors. At the top portion 25, the real flame tends to appear pale blue or light gray, approaching white, with further reduced brightness and even lighter colors. By implementing above gradient control of brightness and color from the bottom portion 23 to the top portion 25, the flame lamp is able to simulate the dynamic variations of the real flame more realistically, such that the flame effect of the flame lamp is more natural and vivid. It is understood that such variations in color and brightness can be achieved by controlling an illumination, an extinction, and brightness levels of the plurality of lamp beads 2121.

In an embodiment of the present application, as shown in FIG. 3, during an on-off variation cycle, each lighting element 212 has a lighting ratio defined as a ratio of a lighting duration time to a total duration of the on-off variation cycle; the lighting ratio of the at least one bottom lighting element is greater than that of the at least one middle lighting element, and the lighting ratio of the at least one middle lighting element is greater than that of the at least one top lighting element. When the real flame combusting, the base portion of the real flame is more stable and sustained for a longer duration, however the main portion and the tip portion of the real flame tend to flicker more frequently, with each flicker lasting for a shorter duration. In the present disclosure, the at least one bottom lighting element has a higher lighting ratio and flickers with lower flickering frequency to simulate the base portion of the real flame. The at least one middle lighting element has a moderate lighting ratio, and flickers with a higher flickering frequency relative to the at least one bottom lighting element. The at least one top lighting element has a lower lighting ratio, and flickers with the highest flickering frequency to simulate a rapid dancing effect of the flame tip. In this way, the flame lamp is able to simulate the dynamic flickering of the real flame more realistically, creating a more layered and natural flame effect.

As shown in FIG. 4, in an embodiment, the at least one flexible light strip 2 can be folded in one plane, or at least one flexible light strip 2 can be configured as a helical structure. The bottom portion 23 includes at least two bottom lighting elements which are positioned at a same height or approximately the same height, the at least two bottom lighting elements are configured to be turned on or turned off at different time points; the middle portion 24 includes at least two middle lighting elements which are positioned at the same height or at approximately the same height, the at least two middle lighting elements are configured to be turned on or turned off at different time points; the top portion 25 includes at least two top lighting elements which are positioned at the same height or at approximately the same height, the at least two top lighting elements are configured to be turned on or turned off at different time points. When the plurality of lighting elements of the flame section are arranged along a vertical or substantially vertical direction, at least one first turning-on time difference and at least one first turning-off time difference are defined between the at least one bottom lighting element and the at least one middle lighting element; at least one second turning-on time difference and at least one second turning-off time difference are defined between the at least one middle lighting element and the at least one top lighting element, the at least one first turning-on time difference is greater than the at least one second turning-on time difference, the at least one first turning-off time difference is greater than the at least one second turning-off time difference. In this way, the flame lamp can simulate the dynamic flickering of the real flame, achieving a more natural and realistic visual effect of the flame lamp.

In an embodiment of the present disclosure, as shown in FIG. 3 and FIG. 4, when at least two bottom lighting elements of the at least one bottom lighting element are positioned at a same height or at approximately the same height in the bottom portion 23, at least two middle lighting elements of the at least one middle lighting element are positioned at the same height or at approximately the same height in the middle portion 24, and when at least two top lighting elements of the at least one top lighting element are positioned at the same height or at approximately the same height in the top portion 25, the at least two bottom lighting elements are grouped into a first bottom lighting group and a second bottom lighting group, the at least two middle lighting elements are grouped into a first middle lighting group and a second middle lighting group, and the at least two top lighting elements are grouped into a first top lighting group and a second top lighting group. The first bottom lighting group are alternately arranged with the second bottom lighting group, and the first bottom lighting group and the second bottom lighting group are configured to be turned on at different time points and turned off at different time points; the first middle lighting group are alternately arranged with the second middle lighting group, and the first middle lighting group and the second middle lighting group are configured to be turned on at different time points and turned off at different time points; the first top lighting group are alternately arranged with the second top lighting group, and the first top lighting group and the second top lighting group are configured to be turned on at different time points and turned off at different time points. When the first bottom lighting group, the first middle lighting group and the first top lighting group are arranged along a vertical or substantially vertical direction, at least one first turning-on time difference and at least one first turning-off time difference are defined between the first bottom lighting group and the first middle lighting group; at least one second turning-on time difference and at least one second turning-off time difference are defined between the first middle lighting group and the at first top lighting group, the at least one first turning-on time difference is greater than the at least one second turning-on time difference, the at least one first turning-off time difference is greater than the at least one second turning-off time difference; or when the second bottom lighting group, the second middle lighting group and the second top lighting group are arranged along a vertical or substantially vertical direction, at least one first turning-on time difference and at least one first turning-off time difference are defined between the second bottom lighting group and the second middle lighting group; at least one second turning-on time difference and at least one second turning-off time difference are defined between the second middle lighting group and the second top lighting group, the at least one first turning-on time difference is greater than the at least one second turning-on time difference, the at least one first turning-off time difference is greater than the at least one second turning-off time difference. Such that the plurality of lighting elements 212 can be controlled in groups, therefore, the complexity in control is reduced, the dynamic flickering effect is achieved. It should be clarified that lighting elements 212 in a same group can be turned on or turned off simultaneously.

In an embodiment, as shown in FIG. 2, the flame lamp further includes a wire 22, and the wire 22 is sequentially connected to the plurality of lighting structures 21. The wire 22 is made of a flexible material and has a bending property, such that the wire 22 can be freely bent as needed. Therefore the flame lamp can be formed into various shapes, such as spiral, wavy, branch-like, or other decorative forms, which improves decorative appeal and visual attractiveness of the flame lamp. In some embodiments, the wire 22 may be an insulated copper wire or an enameled wire.

In an embodiment of the present disclosure, as shown in FIG. 2, the wire 22 at least includes a signal transmission wire 221. and the plurality of sub-control chips 211 in the same flexible light strip 2 are electrically connected in signal series with the main control chip 1 through the signal transmission wire 221.

Figure 6:
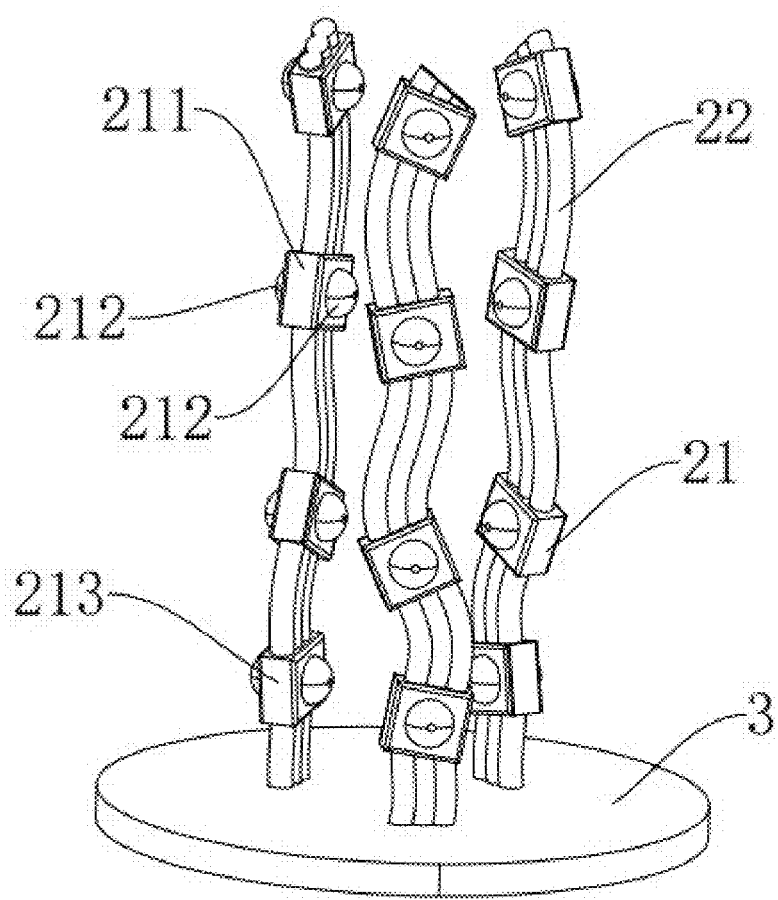
FIG. 6 is a fourth structural schematic view of the flame lamp according to an embodiment of the present disclosure.

In an embodiment of the present disclosure, as shown in FIG. 6, the sub-control chip 211 is encapsulated together with the corresponding lighting element 212, such that the sub-control chip 211 can directly and precisely control the lighting element 212 to achieve a more flexible brightness adjustment and a dynamic display effect. In some embodiments, the lighting structure 21 is an LED lamp encapsulated with the sub-control chip 211. Two lighting elements 212 can be provided on one sub-control chip 211, and the two lighting elements 212 are arranged in opposite directions, such that both a front surface and a back surface of the flexible light strip 2 can emit light, and the flame effect can be richer.

In an embodiment of the present disclosure, according to FIGS. 1 to 6, the flame lamp includes at least one flexible light strip 2. The flexible light strip 2 includes a wire 22 and a plurality of lighting structures 21 connected in sequence via the wire 22. Each of the lighting structures 21 includes a lighting element 212. In one or more flexible light strips 2, the plurality of lighting elements 212 together form the flame section 213. Under the control of the main control chip 1, the plurality of lighting elements 212 are capable of switching on and off in the set timing sequence, to simulate the dynamic effect of the real flame. The wire 22 has the bending property, such that the wire 22 can be freely bent as needed to form flame sections 2113 with different shapes, and a shaping flexibility of the flame lamp has been enhanced.

In an embodiment of the present disclosure, according to FIGS. 2 and 3, the flame lamp further includes a support member 3. In some embodiments, the support member 3 is configured as a circular substrate. The circular substrate is adaptively connected with a conventional lamp to assemble into the flame lamp. The main control chip 1 is mounted on the support member 3 and is configured to control an overall operation and lighting effects of the flame lamp. The number of flexible light strips 2 can be one or more. One or more flexible light strips 2 are arranged in a folded layout on the same plane to form a disk-shaped flame section 213, the disk-shaped flame section 213 may be approximately rectangular, circular, or of other shapes. The flame section 213 is connected via the wire 22 and suspended below the support member 3, such that the flame section 213 can be suspended in a space, and the flame lamp is more suitable for scenarios that require suspension.

Figure 12:
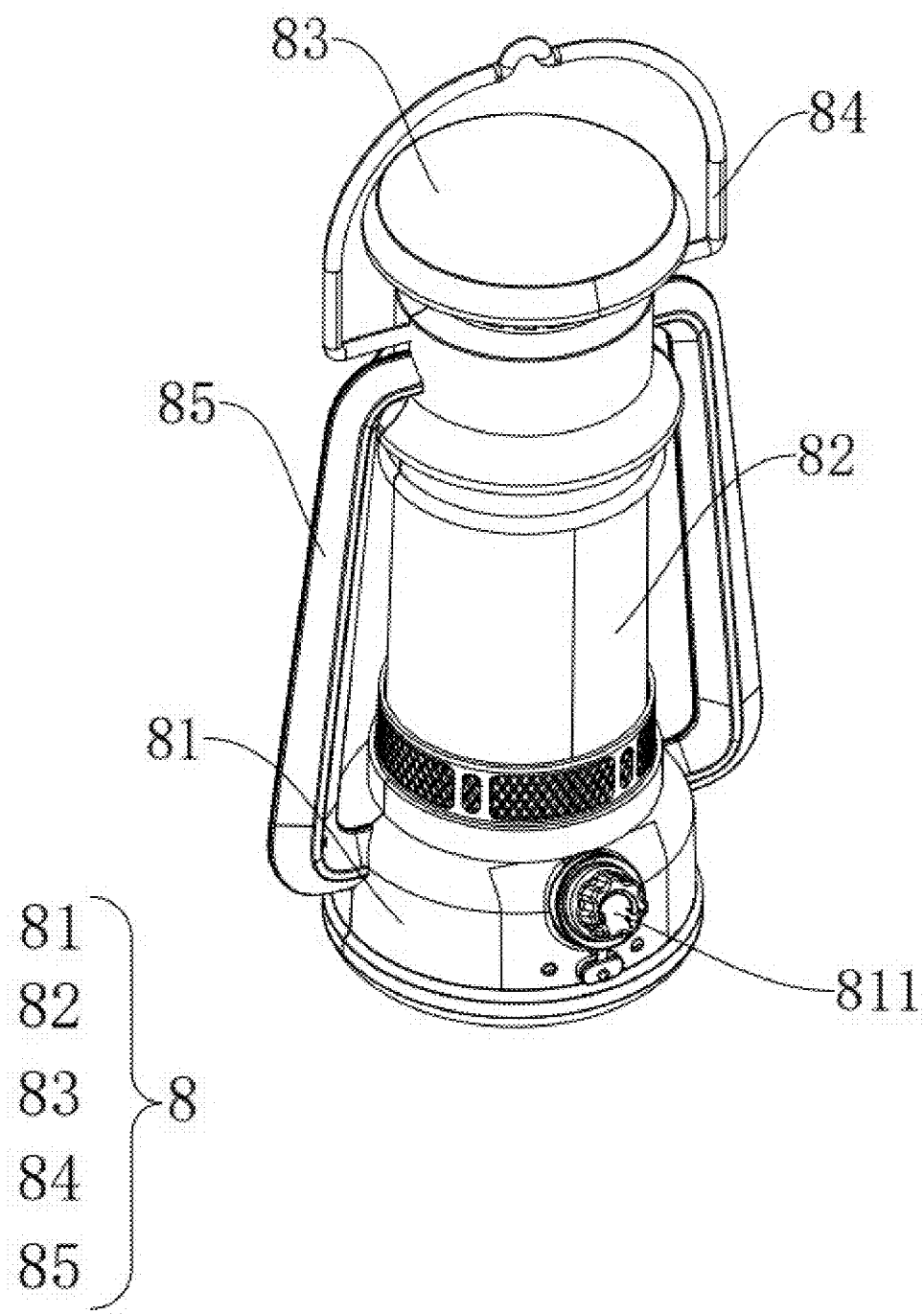
FIG. 12 is a structural schematic view of a portable lamp according to an embodiment of the present disclosure.
Figure 13:
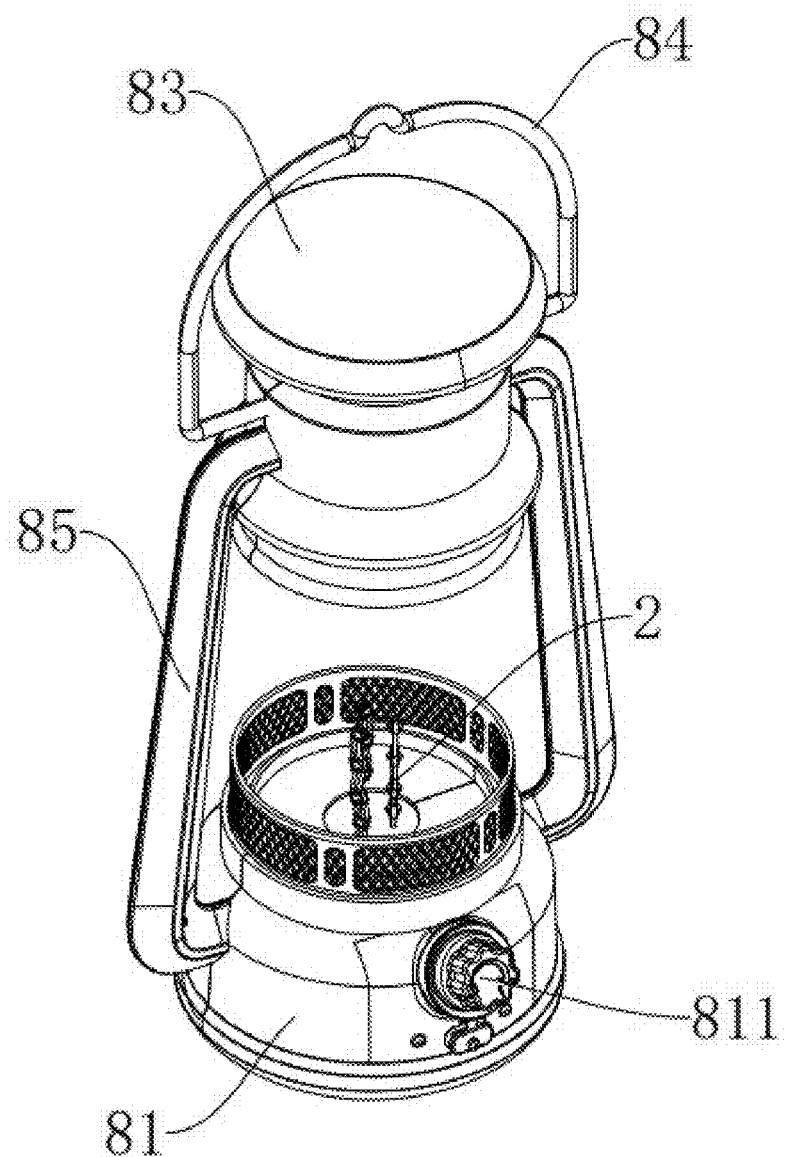
FIG. 13 is a partial structural schematic view of the portable lamp according to an embodiment of the present disclosure.

In an embodiment of the present disclosure, according to FIGS. 6, 12, and 13, the flame lamp includes a support member 3. In some embodiments, the support member 3 is configured as a circular substrate. The circular substrate is configured to connected with a conventional lamp to assemble into the flame lamp. The main control chip 1 is mounted on the bracket 3. The number of the flexible light strips 2 may be one or more. One or more flexible light strips 2 vertically or substantially vertically extend from the support member 3 to form the flame section 213. The flexible light strips 2 may be configured with curves to achieve a substantially vertical extension effect. When the number of the flexible light strips 2 is more than one, the plurality of flexible light strips 2 are arranged in a clustered layout on the support member 3 to generate a brighter lighting effect. The present disclosure further provides a portable lamp 8 including a first lamp base 81, a first top cover 83, a handle 84, and a first lampshade 82. A battery and a driving circuit are arranged inside the first lamp base 81 to provide power supply. A first operation switch 811 is also arranged on the first lamp base 81 for operating the portable lamp 8. A first connecting portion positioned on the first lamp base 81 and is configured to connect the support member 3. The support member 3 is provided with the plurality of flexible light strips 2 arranged in the clustered layout. The first top cover 83 and the first lamp base 81 are spaced with each other along a vertical direction. The first lampshade 82 is connected between the first top cover 83 and the first lamp base 81, and is configured to cover the plurality of flexible light strips 2. The handle 84 is disposed on the first top cover 83, which facilitates the user to grasp the first top cover 83. In addition, two side handles 85 are further provided in the present disclosure, one of the two side handles 85 is connected to a left side of the first lamp base 81, and the other one of the two side handles 85 is connected to a right side of the first top cover 83.

In an embodiment of the present disclosure, as shown in FIG. 4, the flame lamp further includes a wick column 4. In an embodiment, the wick column 4 is configured as a columnar structure. The number of the flexible light strips 2 may be one or more. One or more flexible light strips 2 are helically wound around the wick column 4 to form the flame section 213, such that the light emitted from the flame lamp can be more uniform, and the flame lamp is capable of presenting a three-dimensional flame effect. By adjusting wounding density or shapes of the flexible light strips, a helical winding structure can be adjusted as needed to achieve different flame effects. For example, the flexible light strips 2 can be arranged at varying heights along the wick column 4, which facilitates to create a layered appearance to simulate the dynamic movement of the real flame. In addition, the wick column 4 may serve as a supporting structure, stabilizing the flexible light strips 2 and supplying electrical connections.

Figure 5:
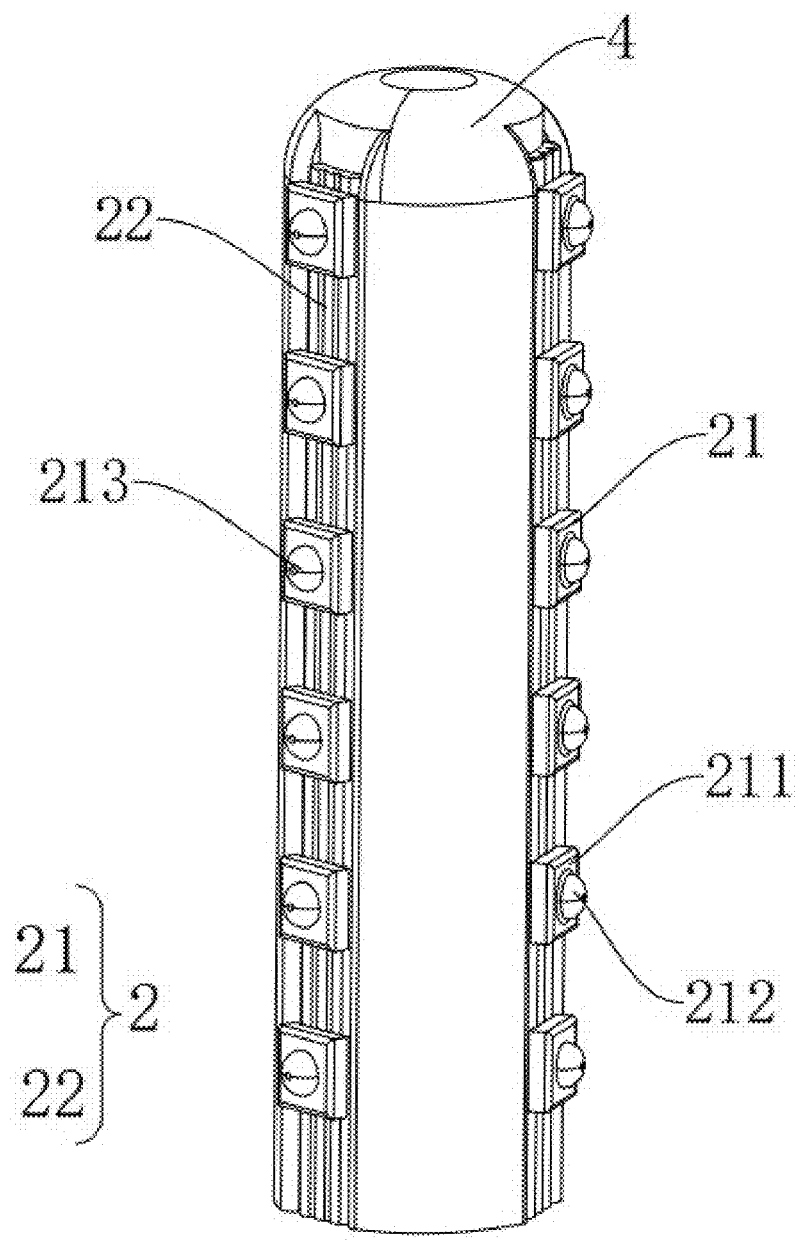
FIG. 5 is a third structural schematic view of the flame lamp according to an embodiment of the present disclosure.
Figure 10:
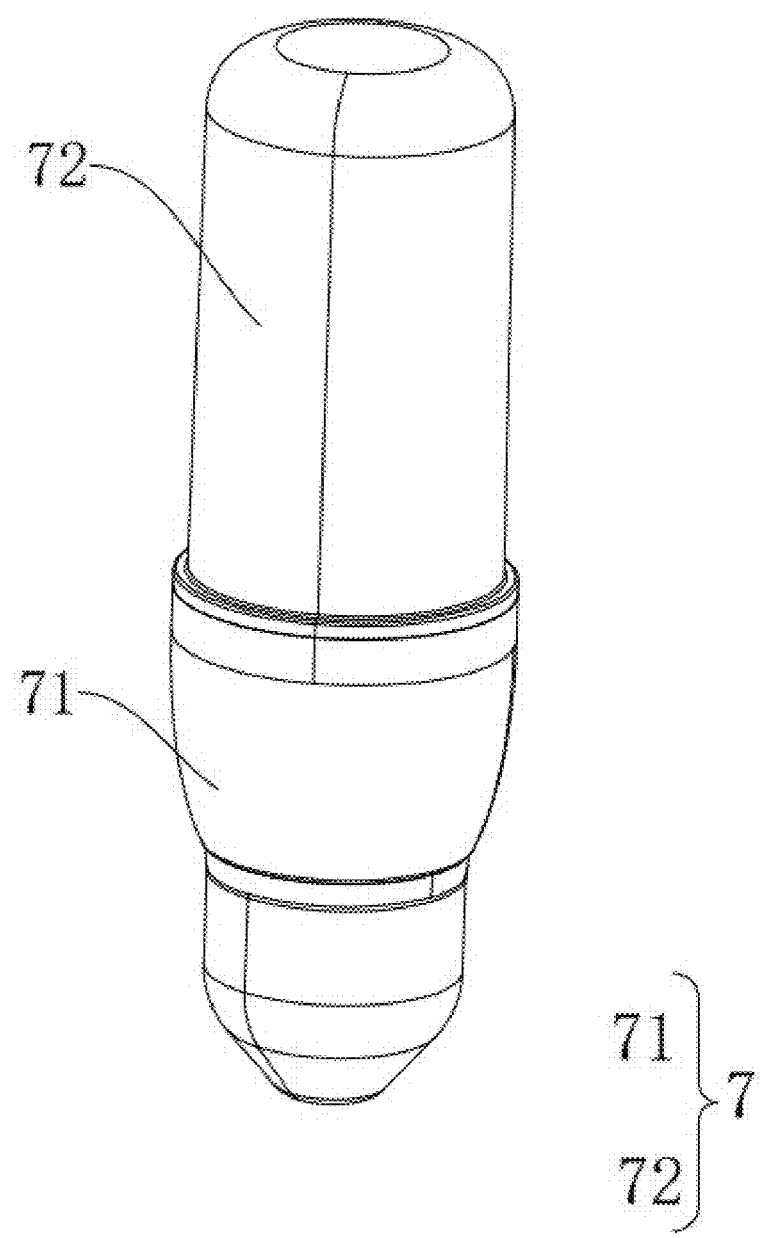
FIG. 10 is a structural schematic view of a bulb according to an embodiment of the present disclosure.
Figure 11:
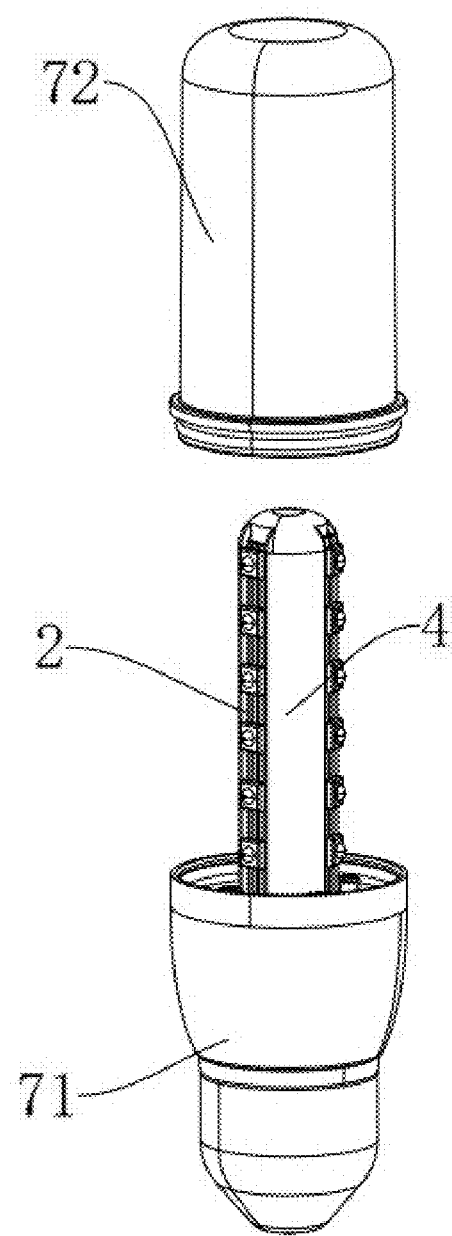
FIG. 11 is an exploded schematic view of the bulb according to an embodiment of the present disclosure.

In an embodiment of the present disclosure, as shown in FIG. 5, FIG. 10 and FIG. 11, the flame lamp further includes a wick column 4. The wick column 4 is configured as a columnar structure. The number of the flexible light strips 2 may be one or more. One or more flexible light strips 2 extend along a longitudinal direction of the wick column 4. In some embodiments, the flexible light strips 2 are spaced apart from each other and embedded on a side surface of the wick column 4 to form the flame section 213. By being arranged along the length of the wick column 4, the flexible light strips 2 can better simulate the shape and dynamic movement of a real flame. The present disclosure further provides a bulb 7. The bulb 7 includes a second base 71 and a second lampshade 72 connected to the second base 71. The second lamp base 71 includes a second connecting portion. The wick column 4 is mounted on the second connecting portion of the second base 71 and is positioned inside the second lampshade 72. Power supply and control of the flexible light strips 2 are achieved through an internal circuitry of the wick column 4. The flexible light strips 2 may be arranged to extend along the wick column 4 and be embedded on the side surface of the wick column 4, or may be helically wound around the wick column 4, such that the flame lamp may simulate the real flame effect through the second lampshade 72.

Figure 7:
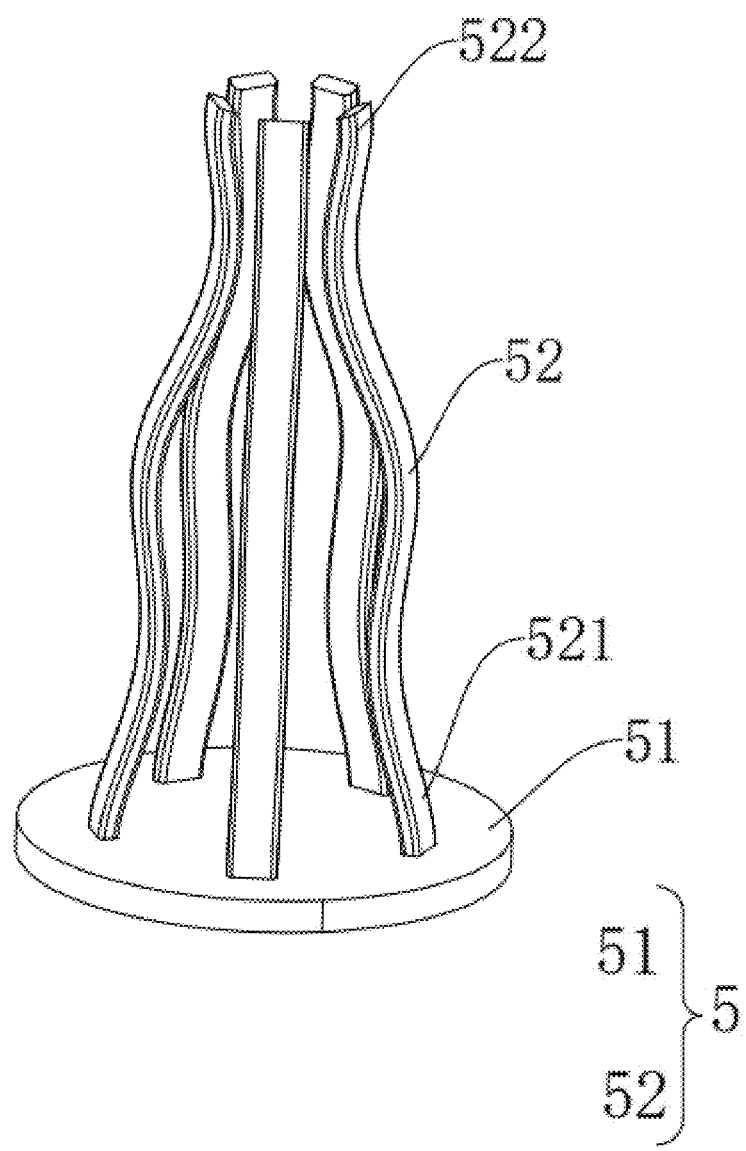
FIG. 7 is a structural schematic view of a shaping frame according to an embodiment of the present disclosure.
Figure 8:
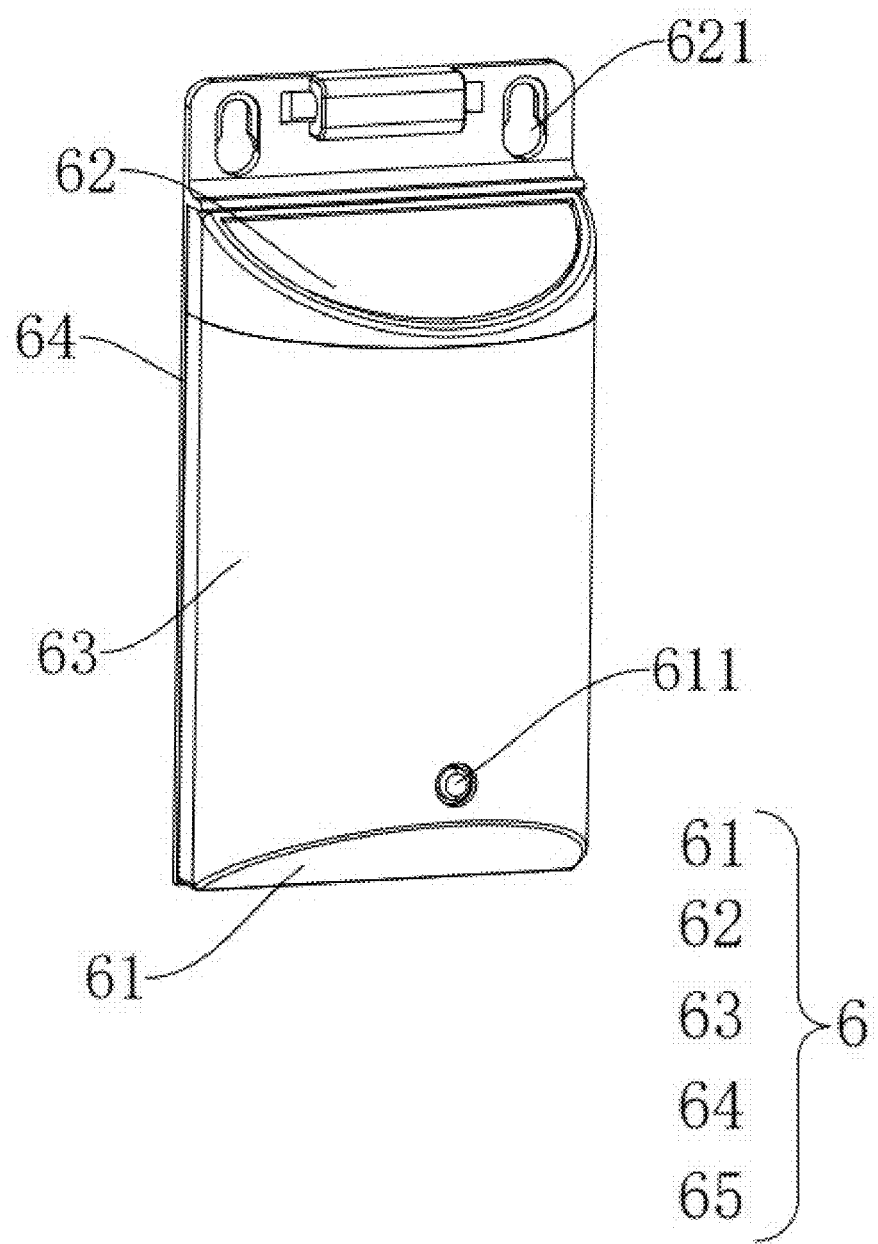
FIG. 8 is a structural schematic view of a wall lamp according to an embodiment of the present disclosure.
Figure 9:
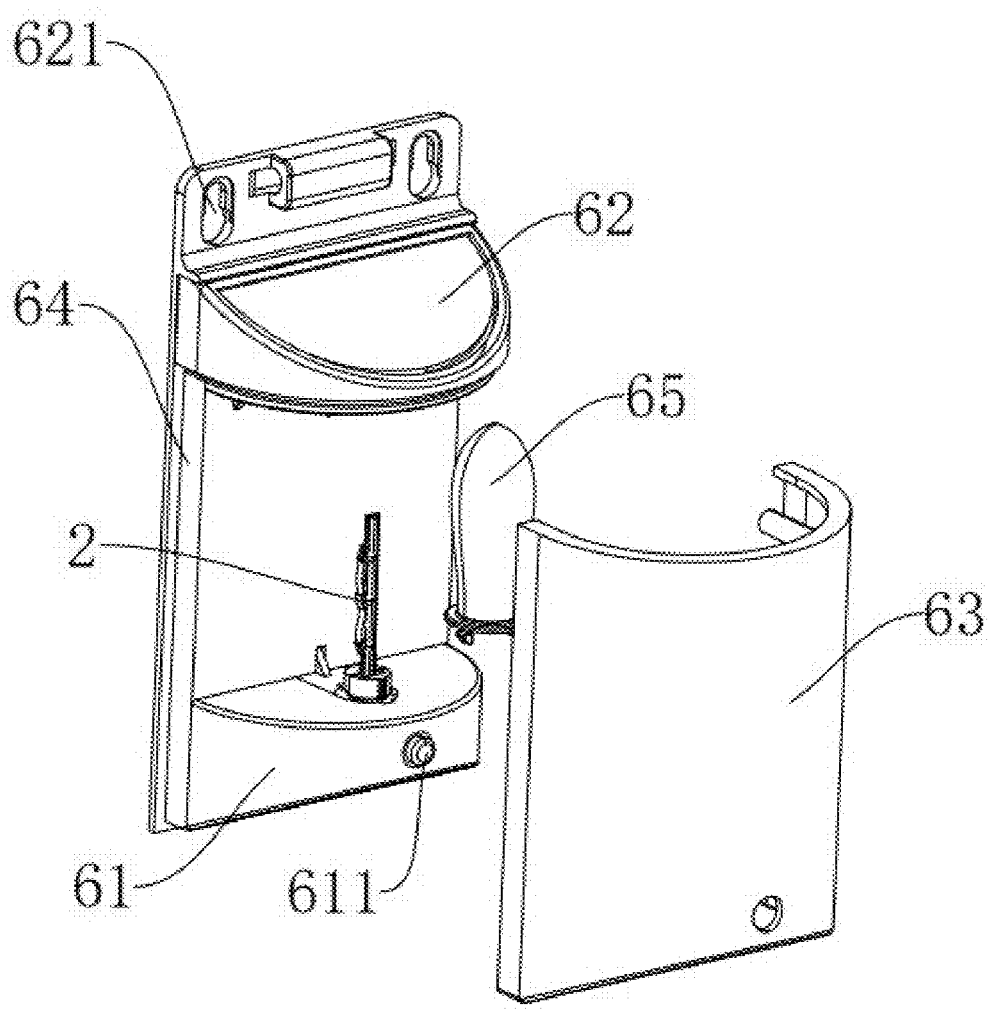
FIG. 9 is an exploded schematic view of the wall lamp according to an embodiment of the present disclosure.

In an embodiment of the present disclosure, as shown in FIG. 7, FIG. 8, and FIG. 9, the flame lamp may include a shaping frame 5. The shaping frame 5 includes a base plate 51 and a plurality of guide rods 52. In some embodiments, the base plate 51 is a circular substrate which can be mounted on the conventional lamp. A plurality of first ends 521 of the plurality of guide rods 52 are arranged on the base plate 51 along a circular shape, a plurality of second ends 522 are configured to converge with each other, and each guide rod 52 has a wavy shape at the second end 522. The plurality of flexible light strips 2 are extended along the plurality of guide rods 52 to form the flame section 213. It should be understood that the shapes of the guide rods 52 can be customized as needed. Due to the bendable characteristic of the flexible light strips 2, the flexible light strips 2 can be bent into various shapes to create different appearances of the flame section 213. The number of guide rods 52 may be one or more, as long as they can serve to support the flexible light strips 2. The present disclosure further provides a wall lamp 6. The wall lamp 6 includes a lamp panel 64, a third lamp base 61, a second top cover 62, a lamp housing 63, and a third lampshade 65. The third lamp base 61, the second top cover 62, the lamp housing 63, and the third lampshade 65 are arranged at a same side of the lamp panel 64. Two holes 621 are defined in the lamp panel 64 and configured for mounting the lamp panel 64 onto a wall via fasteners, such as screws. The third lamp base 61 and the second top cover 62 are spaced apart along a vertical direction. The battery and the driving circuit are arranged within the third lamp base 61 to supply power. A second operation switch 611 is arranged on the third lamp base 61 to operate the wall lamp 6. The shaping frame 5 is mounted at a third connecting portion of the third lamp base 61. The number of the guide rods 52 of the shaping frame 5 may be one or more, and the flexible light strips 2 are arranged along the guide rods 52. The third lampshade 65 is disposed to cover the flexible light strips 2. The lamp housing 63 is arranged between the third lamp base 61 and the second top cover 62 and is enclosed together with the lamp panel 64.

In an embodiment of the present disclosure, as shown in FIG. 1, the lighting structure 21 includes the lighting element 212 and the control chip 211 electrically connected to the lighting element 212. In the same flexible light strip 2, a plurality of sub-control chips 211 are signally connected with each other in sequence, and the main control chip 1 is signally connected with the initial sub-control chip of each flexible light strip 2. Therefore, the plurality of control signals generated by the main control chip 1 can be sequentially transmitted to each sub-control chip 211. Each sub-control chip 211 responds to and executes the corresponding control signal, such that all of lighting elements 212 on the same flexible light strip 2 can be controlled. As a result, the dynamic variation of the real flame can be better simulated, and an overall visual effect of the flame lamp can be enhanced to more closely resemble the real flame.

Obviously, the embodiments described above are only a part of the embodiments of the present disclosure, and not all of them. The accompanying drawings give some embodiments of the present disclosure, but do not limit the patentable scope of the disclosure, which may be realized in many different forms. Rather, these embodiments are provided for the purpose of providing a more thorough and comprehensive understanding of the present disclosure. Although the present disclosure has been described in detail with reference to the foregoing embodiments, it is still possible for a person skilled in the art to modify the technical solutions recorded in the foregoing specific embodiments or to make equivalent substitutions for some of the technical features therein. Any equivalent structure made by utilizing the contents of the specification and the accompanying drawings of the present disclosure, directly or indirectly applied in other related technical fields, are all the same within the scope of the patent protection of the present disclosure.

What is claimed is:

1. A flame lamp, comprising:
   a main control chip;
   at least one lighting assembly, wherein each lighting assembly comprises a plurality of lighting structures, the plurality of lighting structures comprises a plurality of lighting elements and a plurality of sub-control chips; and each lighting structure comprises respective one of the plurality of lighting element and respective one of the plurality of sub-control chips electrically connected to the respective one of the plurality of lighting element;
   wherein the plurality of sub-control chips are signally connected with each other in sequence;
   wherein the main control chip is signally connected to an initial sub-control chip of each lighting assembly, the main control chip is configured to control the plurality of lighting elements through the plurality of sub-control chips according to a set timing sequence to simulate a shape of a real flame.

2. The flame lamp according to claim 1, wherein at least one of the at least one lighting assembly is a flexible light strip, the plurality of lighting structures within the flexible light strip are signally connected in-series.

3. The flame lamp according to claim 1, wherein the main control chip is configured to emit a plurality of control signals, each control signal corresponds to one of the plurality of sub-control chips, and the plurality of control signals are transmitted through the plurality of sub-control chips in a signal connected order.

4. The flame lamp according to claim 3, wherein after each of the plurality of sub-control chips receives respective one of the plurality of control signals, the main control chip is configured to emit a latch signal, each sub-control chip latches a received control signal based on the latch signal, the main control chip then is configured to emit a display signal, and each sub-control chip activates the lighting element based on a latched control signal.

5. The flame lamp according to claim 1, wherein each control signal comprises display color information, display brightness information, and lighting duration information.

6. The flame lamp according to claim 1, wherein the lighting element comprises a plurality of lamp beads with different colors, and the main control chip is configured to control the plurality of lamp beads to turn on, turn off, or adjust a display brightness of the plurality of lamp beads, the lighting element is configured to display different display brightness levels and different display colors by blending lighting effects of the plurality of lamp beads.

7. The flame lamp according to claim 1, wherein the plurality of lighting elements in the lighting assembly together form a flame section, and the flame section comprises a bottom portion, a middle portion, and a top portion, along a combustion direction from bottom to top, the bottom portion comprises at least one bottom lighting element, the middle portion comprises at least one middle lighting element, the top portion comprises at least one top lighting element.

8. The flame lamp according to claim 7, wherein:
   display brightness of the at least one middle lighting element is greater than that of the at least one bottom lighting element, and display brightness of the at least one middle lighting element is greater than that of the at least one top lighting element; and
   display color of the at least one top lighting element is lighter than that of the at least one middle lighting element, and display color of the at least one middle lighting element is lighter than that of the at least one bottom lighting element.

9. The flame lamp according to claim 7, wherein:
   during an on-off variation cycle, each lighting element of the plurality of lighting elements is configured to be turned on and turned off once, or to be turned on and turned off a plurality of times, and each lighting element has a lighting ratio defined as a ratio of a lighting duration time to a total duration of the on-off variation cycle; and
   the lighting ratio of the at least one bottom lighting element is greater than that of the at least one middle lighting element, and the lighting ratio of the at least one middle lighting element is greater than that of the at least one top lighting element.

10. The flame lamp according to claim 7, wherein;
    when at least two bottom lighting elements of the at least one bottom lighting element are positioned at a same height or at approximately the same height, the at least two bottom lighting elements are configured to be turned on or turned off at different time points;
    when at least two middle lighting elements of the at least one middle lighting element are positioned at the same height or at approximately the same height, the at least two middle lighting elements are configured to be turned on or turned off at different time points;
    when at least two top lighting elements of the at least one top lighting element are positioned at the same height or at approximately the same height, the at least two top lighting elements are configured to be turned on at different time points;
    when the plurality of lighting elements of the flame section are arranged along a vertical or substantially vertical direction, at least one first turning-on time difference and at least one first turning-off time difference are defined between the at least one bottom lighting element and the at least one middle lighting element; at least one second turning-on time difference and at least one second turning-off time difference are defined between the at least one middle lighting element and the at least one top lighting element, the at least one first turning-on time difference is greater than the at least one second turning-on time difference, the at least one first turning-off time difference is greater than the at least one second turning-off time difference.

11. The flame lamp according to claim 7, wherein:
when at least two bottom lighting elements of the at least one bottom lighting element are positioned at a same height or at approximately the same height in the bottom portion, at least two middle lighting elements of the at least one middle lighting element are positioned at the same height or at approximately the same height in the middle portion, and when at least two top lighting elements of the at least one top lighting element are positioned at the same height or at approximately the same height in the top portion, the at least two bottom lighting elements are grouped into a first bottom lighting group and a second bottom lighting group, the at least two middle lighting elements are grouped into a first middle lighting group and a second middle lighting group, and the at least two top lighting elements are grouped into a first top lighting group and a second top lighting group;
the first bottom lighting group are alternately arranged with the second bottom lighting group, and the first bottom lighting group and the second bottom lighting group are configured to be turned on at different time points and turned off at different time points; the first middle lighting group are alternately arranged with the second middle lighting group, and the first middle lighting group and the second middle lighting group are configured to be turned on at different time points and turned off at different time points; the first top lighting group are alternately arranged with the second top lighting group, and the first top lighting group and the second top lighting group are configured to be turned on at different time points and turned off at different time points; and
when the first bottom lighting group, the first middle lighting group and the first top lighting group are arranged along a vertical or substantially vertical direction, at least one first turning-on time difference and at least one first turning-off time difference are defined between the first bottom lighting group and the first middle lighting group; at least one second turning-on time difference and at least one second turning-off time difference are defined between the first middle lighting group and the at first top lighting group, the at least one first turning-on time difference is greater than the at least one second turning-on time difference, the at least one first turning-off time difference is greater than the at least one second turning-off time difference; or when the second bottom lighting group, the second middle lighting group and the second top lighting group are arranged along a vertical or substantially vertical direction, at least one first turning-on time difference and at least one first turning-off time difference are defined between the second bottom lighting group and the second middle lighting group; at least one second turning-on time difference and at least one second turning-off time difference are defined between the second middle lighting group and the second top lighting group, the at least one first turning-on time difference is greater than the at least one second turning-on time difference, the at least one first turning-off time difference is greater than the at least one second turning-off time difference.

12. The flame lamp according to claim 2, wherein the flame lamp further comprises a wire, the wire connects the plurality of lighting structures in sequence, and the wire is flexible.

13. The flame lamp according to claim 1, wherein the lighting element and the sub-control chip are encapsulated together to form the lighting structure.

14. A flame lamp, comprising:
at least one flexible light strip, wherein the flexible light strip comprises a wire and a plurality of lighting structures that are sequentially connected via the wire; wherein the plurality of lighting structures of the at least one flexible light strip together form a flame section; and
a main control chip, wherein the main control chip is electrically connected to the at least one flexible light strip, and is configured to control on-off variations of the plurality of lighting structures in the flame section according to a set timing sequence to simulate a shape of a real flame;
wherein, each of the at least one flexible light strip comprises a plurality of sub-control chips, and each lighting structure of the at least one flexible light strip comprises a lighting element and a sub-control chip electrically connected to the lighting element, the plurality of sub-control chips are signally connected with each other in sequence, and the main control chip is signally connected to an initial sub-control chip of each flexible light strip.

15. The flame lamp according to claim 14, further comprising a support member, wherein the main control chip is arranged on the support member, the at least one flexible light strip is folded to form the flame section, and the flame section is suspended below the support member via the wire.

16. The flame lamp according to claim 14, further comprising a support member, wherein the main control chip is arranged on the support member, and the at least one flexible light strip extends along a vertical or substantial vertical direction on the support member to form the flame portion.

17. The flame lamp according to claim 14, further comprising a wick column, wherein the at least one flexible light strip is spirally wound around the wick column to form the flame section.

18. The flame lamp according to claim 14, further comprising a wick column, wherein the at least one flexible light strip extends along a length direction of the wick column, and the at least one flexible light strip is embedded on the wick column to form the flame section.

19. The flame lamp according to claim 14, further comprising a shaping frame, wherein the shaping frame comprises a base plate and a plurality of guide rods, each guide rod comprises a first end and a second end, a plurality of first ends are arranged on the base plate along a circular shape, a plurality of second ends are configured to converge with each other, and each guide rod has a wavy shape at the second end, and the at least one flexible light strip is arranged along the plurality of guide rods to form the flame section.

* * * * *